(12) United States Patent
Shinohara (10) Patent No.: US 7,502,181 B2
(45) Date of Patent: Mar. 10, 2009

(54) IMAGING LENS (75) Inventor: Yoshikazu Shinohara, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 11/727,799

(22) Filed: Mar. 28, 2007

(65) Prior Publication Data
US 2007/0229984 A1 Oct. 4, 2007

(30) Foreign Application Priority Data
Mar. 28, 2006 (JP) ............................ P2006-087408

(51) Int. Cl.
G02B 9/60 (2006.01)
(52) U.S. Cl. ..................................... 359/764
(58) Field of Classification Search ................ 359/714, 359/753, 763, 766, 765, 764, 682
See application file for complete search history.

(56) References Cited

U.S. PATENT DOCUMENTS

| 4,983,026 A | 1/1991 | Kudo et al. |
| 6,094,314 A | 7/2000 | Tanaka |
| 6,392,804 B1 | 5/2002 | Yano et al. |
| 7,215,477 B2 * | 5/2007 | Yamasaki et al. ........... 359/649 |

FOREIGN PATENT DOCUMENTS

| JP | 10-161022 A | 6/1998 |
| JP | 2005-208236 A | 8/2005 |

* cited by examiner

Primary Examiner—Alicia M Harrington
(74) Attorney, Agent, or Firm—Birch, Stewart, Kolasch & Birch, LLP (57) ABSTRACT

An imaging lens is provided and includes: a positive first lens with a convex surface directed to the object side; a second lens having a negative meniscus shape with a concave surface directed to the image side; a third lens having a positive meniscus shape with a convex surface directed to the image side; a negative fourth lens with both surfaces being an aspheric surface and the image-side surface being concave in the proximity of the optical axis; and a positive or negative fifth lens with both surfaces being an aspheric surface, in order from the object side. The following conditional expressions are satisfied as for Abbe numbers vd1 and vd2 of the first lens and the second lens and Abbe number vd4 of the fourth lens.

$$vd1 > 50 \qquad (1)$$

$$vd2 < 30 \qquad (2)$$

$$vd4 < 30 \qquad (3)$$

24 Claims, 12 Drawing Sheets

EXAMPLE 2

FIG. 1

EXAMPLE 1

FIG. 2

EXAMPLE 2

FIG. 3

EXAMPLE 3

FIG. 4

EXAMPLE 4

FIG. 5A

| | EXAMPLE 1 LENS DATA | | | | |
|---|---|---|---|---|---|
| | Si (SURFACE NUMBER) | Ri (CURVATURE RADIUS) | Di (SPACING) | Ndi (REFRACTIVE INDEX) | vdj (ABBE NUMBER) |
| | 1 (APERTURE DIAPHGRAGM) | — | 0 | 1.0 | |
| G1 | 2 | 4.5552 | 1.11193 | 1.472819 | 76.6 |
| | 3 | -6.2432 | 0.1 | 1.0 | |
| G2 | 4 | 5.8352 | 0.65001 | 1.934282 | 27.2 |
| | 5 | 4.0345 | 1.19459 | 1.0 | |
| G3 | 6 | -3.7346 | 1.58758 | 1.533308 | 55.5 |
| | 7 | -1.9462 | 0.1 | 1.0 | |
| G4 | 8 | 4.2427 | 0.65164 | 1.609211 | 27.2 |
| | 9 | 2.3133 | 0.4563 | 1.0 | |
| G5 | 10 | 2.4423 | 0.69969 | 1.511558 | 56 |
| | 11 | 1.6789 | 0.76065 | 1.0 | |
| GC | 12 | ∞ | 0.31043 | 1.518249 | 64.1 |
| | 13 | ∞ | 0.64456 | 1.0 | |

FIG. 5B

| | EXAMPLE 1 ASPHERIC DATA | | | |
|---|---|---|---|---|
| ASPHERIC COEFFICIENT | SURFACE NUMBER | | | |
| | 2ND SURFACE | 3RD SURFACE | 6TH SURFACE | 7TH SURFACE |
| KA | -1.209619 | 13.8956596 | 1.5038712 | 0.0627481 |
| $B_4$ | -1.8E-02 | -1.3E-03 | -1.1E-02 | -5.2E-03 |
| $B_5$ | 3.3E-02 | -4.7E-03 | 4.8E-03 | 5.5E-03 |
| $B_6$ | -2.7E-02 | 6.7E-03 | 7.5E-04 | -1.4E-03 |
| $B_7$ | -9.5E-03 | -3.7E-03 | -5.3E-03 | -9.7E-04 |
| $B_8$ | 4.8E-03 | 5.5E-04 | -8.8E-05 | -8.5E-05 |
| $B_9$ | 1.5E-02 | -5.3E-04 | 3.3E-03 | 3.7E-04 |
| $B_{10}$ | -8.4E-03 | 3.8E-04 | -1.0E-03 | -3.3E-05 |
| | 8TH SURFACE | 9TH SURFACE | 10TH SURFACE | 11TH SURFACE |
| KA | -5.809449 | -0.334924 | -11.2701 | -5.113149 |
| $B_4$ | -1.8E-02 | -5.8E-02 | -3.6E-02 | -2.4E-02 |
| $B_5$ | 2.8E-03 | 2.3E-02 | 7.3E-03 | 4.5E-03 |
| $B_6$ | -1.6E-03 | -2.5E-03 | 1.3E-03 | 1.4E-04 |
| $B_7$ | 8.0E-04 | -8.4E-04 | 1.3E-04 | 1.2E-05 |
| $B_8$ | -1.6E-04 | 2.4E-04 | -3.6E-05 | -2.2E-05 |
| $B_9$ | 9.7E-05 | 1.6E-05 | -4.1E-05 | 1.5E-05 |
| $B_{10}$ | -3.6E-05 | -8.2E-06 | 5.8E-06 | -3.4E-06 |

FIG. 6A

EXAMPLE 2 LENS DATA

| | Si (SURFACE NUMBER) | Ri (CURVATURE RADIUS) | Di (SPACING) | Ndi (REFRACTIVE INDEX) | vdj (ABBE NUMBER) |
|---|---|---|---|---|---|
| | 1 (APERTURE DIAPHGRAGM) | — | 0 | 1.0 | |
| G1 | 2 | 3.9301 | 1.24639 | 1.472819 | 76.6 |
| | 3 | -4.4692 | 0.12012 | 1.0 | |
| G2 | 4 | 9.9878 | 0.65005 | 1.609211 | 27.2 |
| | 5 | 3.6138 | 1.0923 | 1.0 | |
| G3 | 6 | -2.7543 | 1.04868 | 1.533308 | 55.5 |
| | 7 | -1.8464 | 0.12198 | 1.0 | |
| G4 | 8 | 4.0761 | 0.67724 | 1.609211 | 27.2 |
| | 9 | 2.3572 | 0.48991 | 1.0 | |
| G5 | 10 | 2.3576 | 0.68649 | 1.511558 | 56 |
| | 11 | 1.7575 | 0.76065 | 1.0 | |
| GC | 12 | ∞ | 0.31043 | 1.518249 | 64.1 |
| | 13 | ∞ | 0.64503 | 1.0 | |

FIG. 6B

EXAMPLE 2 ASPHERIC DATA

| ASPHERIC COEFFICIENT | SURFACE NUMBER | | | | |
|---|---|---|---|---|---|
| | 2ND SURFACE | 3RD SURFACE | 4TH SURFACE | 5TH SURFACE | 6TH SURFACE |
| KA | -3.564253 | -3.358061 | 17.373294 | 3.6323905 | 1.0034023 |
| $B_4$ | -1.5E-02 | -3.3E-03 | 3.6E-03 | -3.0E-02 | -5.0E-03 |
| $B_5$ | 2.8E-02 | -1.7E-02 | -2.0E-02 | 5.5E-02 | 2.5E-02 |
| $B_6$ | -1.4E-02 | -4.0E-03 | 2.4E-02 | -3.2E-02 | 4.1E-03 |
| $B_7$ | -1.1E-02 | -6.2E-04 | -2.4E-02 | -1.7E-02 | -7.2E-03 |
| $B_8$ | -1.9E-03 | 3.0E-03 | -1.4E-02 | 7.7E-03 | -2.0E-03 |
| $B_9$ | 1.1E-02 | 2.0E-03 | 2.8E-02 | 8.2E-03 | 2.6E-03 |
| $B_{10}$ | -4.7E-03 | -1.5E-03 | -8.8E-03 | -3.8E-03 | -6.3E-04 |
| | 7TH SURFACE | 8TH SURFACE | 9TH SURFACE | 10TH SURFACE | 11TH SURFACE |
| KA | -0.435205 | 0.9535224 | 0.0832114 | -11.18543 | -6.357906 |
| $B_4$ | 1.2E-04 | -1.2E-02 | -5.5E-02 | -2.5E-02 | -2.1E-02 |
| $B_5$ | 9.2E-03 | -4.8E-04 | 2.1E-02 | 1.9E-03 | 1.5E-03 |
| $B_6$ | -1.5E-03 | -2.5E-03 | -3.0E-03 | 4.8E-04 | 5.2E-04 |
| $B_7$ | -1.0E-03 | 8.2E-04 | -7.7E-04 | 2.8E-04 | 8.4E-05 |
| $B_8$ | -1.4E-04 | -8.7E-05 | 2.4E-04 | 6.2E-05 | -2.0E-08 |
| $B_9$ | 4.1E-05 | 9.5E-05 | 2.5E-05 | -1.0E-05 | 6.9E-06 |
| $B_{10}$ | -4.2E-05 | -3.4E-05 | -9.0E-06 | -5.4E-06 | -3.6E-06 |

FIG. 7A

| | EXAMPLE 3 LENS DATA | | | | |
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| | 1 (APERTURE DIAPHGRAGM) | — | 0 | 1.0 | |
| G1 | 2 | 3.207 | 1.19235 | 1.472819 | 76.6 |
| | 3 | -6.3261 | 0.1 | 1.0 | |
| G2 | 4 | 11.4913 | 0.65001 | 1.609211 | 27.2 |
| | 5 | 3.8479 | 1.18781 | 1.0 | |
| G3 | 6 | -2.8561 | 0.99762 | 1.533308 | 55.5 |
| | 7 | -1.6889 | 0.1 | 1.0 | |
| G4 | 8 | 7.6272 | 0.65126 | 1.609211 | 27.2 |
| | 9 | 3.5232 | 0.37926 | 1.0 | |
| G5 | 10 | 2.5727 | 0.69269 | 1.511558 | 56 |
| | 11 | 1.5837 | 0.76065 | 1.0 | |
| GC | 12 | ∞ | 0.31043 | 1.518249 | 64.1 |
| | 13 | ∞ | 0.63991 | 1.0 | |

FIG. 7B

| | EXAMPLE 3 ASPHERIC DATA | | | | |
|---|---|---|---|---|---|
| ASPHERIC COEFFICIENT | SURFACE NUMBER | | | | |
| | 2ND SURFACE | 3RD SURFACE | 4TH SURFACE | 5TH SURFACE | 6TH SURFACE |
| KA | -0.386432 | -11.50706 | 36.661457 | 2.1771944 | 0.3062088 |
| $B_4$ | -1.4E-02 | 8.7E-03 | 8.0E-03 | -9.4E-03 | -1.0E-02 |
| $B_5$ | 3.5E-02 | -2.4E-02 | -2.4E-02 | 1.2E-02 | 8.7E-03 |
| $B_6$ | -2.3E-02 | 1.9E-03 | 1.7E-02 | -9.2E-03 | 6.2E-03 |
| $B_7$ | -7.5E-03 | -2.8E-03 | -1.7E-02 | -9.0E-03 | -4.6E-03 |
| $B_8$ | 7.0E-04 | 1.3E-03 | -1.3E-02 | 2.7E-03 | -1.4E-03 |
| $B_9$ | 8.4E-03 | 3.5E-03 | 2.7E-02 | 5.5E-03 | 2.4E-03 |
| $B_{10}$ | -2.9E-03 | -1.2E-03 | -8.8E-03 | -2.1E-03 | -9.3E-04 |
| | 7TH SURFACE | 8TH SURFACE | 9TH SURFACE | 10TH SURFACE | 11TH SURFACE |
| KA | -0.908181 | 3.0003223 | 0.378195 | -16.0944 | -5.441659 |
| $B_4$ | -1.0E-02 | -1.1E-03 | -3.8E-02 | -2.8E-02 | -3.0E-02 |
| $B_5$ | 8.5E-03 | -6.4E-04 | 1.7E-02 | 4.0E-03 | 8.8E-03 |
| $B_6$ | -1.6E-03 | -2.4E-03 | -3.3E-03 | 1.5E-03 | -2.9E-04 |
| $B_7$ | -6.6E-04 | 7.4E-04 | -7.0E-04 | 1.8E-04 | -2.0E-04 |
| $B_8$ | 4.0E-04 | -1.8E-04 | 3.2E-04 | -4.0E-05 | -2.2E-05 |
| $B_9$ | 4.8E-04 | 1.2E-04 | 1.9E-05 | -4.0E-05 | 1.9E-05 |
| $B_{10}$ | -1.3E-04 | -2.7E-05 | -1.3E-05 | 5.9E-06 | -2.4E-06 |

FIG. 8A

| | EXAMPLE 4 LENS DATA | | | | |
|---|---|---|---|---|---|
| | Si (SURFACE NUMBER) | Ri (CURVATURE RADIUS) | Di (SPACING) | Ndi (REFRACTIVE INDEX) | vdj (ABBE NUMBER) |
| G1 | 1 | 3.4295 | 1.14508 | 1.472819 | 76.6 |
| G1 | 2 | -11.9463 | 0 | 1.0 | |
| | 3 (APERTURE DIAPHGRAGM) | — | 0.20369 | 1.0 | |
| G2 | 4 | 9.1598 | 0.65001 | 1.609211 | 27.2 |
| G2 | 5 | 3.9645 | 1.17969 | 1.0 | |
| G3 | 6 | -4.5982 | 1.29005 | 1.533308 | 55.5 |
| G3 | 7 | -2.0212 | 0.1 | 1.0 | |
| G4 | 8 | 4.6211 | 0.65121 | 1.609211 | 27.2 |
| G4 | 9 | 2.3984 | 0.49999 | 1.0 | |
| G5 | 10 | 2.1229 | 0.75768 | 1.511558 | 56 |
| G5 | 11 | 1.6391 | 0.76065 | 1.0 | |
| GC | 12 | ∞ | 0.31043 | 1.518249 | 64.1 |
| GC | 13 | ∞ | 0.6448 | 1.0 | |

FIG. 8B

| | EXAMPLE 4 ASPHERIC DATA | | | | |
|---|---|---|---|---|---|
| ASPHERIC COEFFICIENT | SURFACE NUMBER | | | | |
| | 1ST SURFACE | 2ND SURFACE | 4TH SURFACE | 5TH SURFACE | 6TH SURFACE |
| KA | 3.9127992 | -26.483638 | 29.0378522 | 3.1494882 | 3.5376019 |
| $B_4$ | -1.8E-02 | 1.5E-02 | 1.2E-02 | -7.9E-03 | -1.7E-02 |
| $B_5$ | 1.9E-02 | -1.3E-02 | -2.1E-02 | 1.7E-02 | 1.5E-02 |
| $B_6$ | -1.4E-02 | -1.3E-03 | 1.6E-02 | -1.6E-02 | 1.2E-03 |
| $B_7$ | -4.0E-03 | -3.8E-03 | -2.3E-02 | -9.7E-03 | -5.3E-03 |
| $B_8$ | -7.6E-04 | 4.5E-04 | -1.3E-02 | 4.6E-03 | -2.5E-04 |
| $B_9$ | 8.2E-03 | 1.7E-03 | 2.7E-02 | 5.6E-03 | 3.1E-03 |
| $B_{10}$ | -4.2E-03 | -1.2E-03 | -9.4E-03 | -2.9E-03 | -1.0E-03 |
| | 7TH SURFACE | 8TH SURFACE | 9TH SURFACE | 10TH SURFACE | 11TH SURFACE |
| KA | 0.3212895 | -0.578685 | 0.2849862 | -6.2276111 | -3.723685 |
| $B_4$ | -6.8E-03 | -1.5E-02 | -4.9E-02 | -3.0E-02 | -3.0E-02 |
| $B_5$ | 1.1E-02 | 5.3E-03 | 2.0E-02 | 5.4E-03 | 7.7E-03 |
| $B_6$ | -2.6E-04 | -2.3E-03 | -3.0E-03 | 9.1E-04 | -1.6E-04 |
| $B_7$ | -1.5E-03 | 5.3E-04 | -8.0E-04 | 1.2E-04 | -2.4E-04 |
| $B_8$ | -4.9E-04 | -2.3E-04 | 2.8E-04 | -3.3E-05 | -5.2E-05 |
| $B_9$ | 3.5E-04 | 1.1E-04 | 1.7E-05 | -3.4E-05 | 1.9E-05 |
| $B_{10}$ | 9.6E-05 | -1.7E-05 | -1.1E-05 | 6.9E-06 | 2.2E-06 |

FIG. 9

| VALUES ON CONDITIONAL EXPRESSIONS | | | | |
|---|---|---|---|---|
| | EXAMPLE 1 | EXAMPLE 2 | EXAMPLE 3 | EXAMPLE 4 |
| f | 6.00 | 6.03 | 6.02 | 6.02 |
| f1 | 5.76 | 6.03 | 4.68 | 5.77 |
| f2 | -16.95 | -9.67 | -9.81 | -12.04 |
| f3 | 5.82 | 7.49 | 5.97 | 5.75 |
| f4 | -9.57 | -10.78 | -11.43 | -9.21 |
| f5 | -15.20 | -22.00 | -10.55 | -29.91 |
| \|f2/f1\| | 2.94 | 1.60 | 2.10 | 2.09 |
| 1/(1/f4+1/f5) | -5.87 | -7.23 | -5.49 | -7.04 |
| \|f3*(1/f4+1/f5)\| | 0.99 | 1.04 | 1.09 | 0.82 |
| $\nu d1$ | 76.7 | 76.7 | 76.7 | 76.7 |
| $\nu d2$ | 27.2 | 27.2 | 27.2 | 27.2 |
| $\nu d4$ | 27.2 | 27.2 | 27.2 | 27.2 |
| G4D(0.0) | 0.65 | 0.68 | 0.65 | 0.65 |
| G4D(0.7) | 0.95 | 0.84 | 0.8 | 0.95 |
| G4D(1.0) | 1.79 | 1.08 | 1.1 | 1.27 |
| G45D(0.0) | 0.46 | 0.49 | 0.38 | 0.5 |
| G45D(1.0) | 0.21 | 0.15 | 0.2 | 0.26 |
| G4MaxH | 3.01 | 2.67 | 3.01 | 3.13 |
| G5MaxH | 2.33 | 2.38 | 2.23 | 2.08 |

IMAGING LENS

BACKGROUND OF THE INVENTION

1. Field of the Invention

This invention relates to an imaging lens installed in an imaging apparatus using an imaging device such as a CCD (Charge Coupled Device), a CMOS (Complementary Metal Oxide Semiconductor), etc.

2. Description of Related Art

In recent years, miniaturization of an imaging device of a CCD, a CMOS, etc., and providing the imaging device with a larger number of pixels have very advanced. Thus, small size and high performance are also demanded for the imaging apparatus main unit and lenses installed therein. To be compatible with an imaging device with a large number of pixels, telecentric property is also demanded so that the incidence angle of the principal ray on an imaging device becomes close to a parallel to the optical axis (the incidence angle on the imaging surface is close to zero with respect to the normal to the imaging surface). Hitherto, for example, an imaging lens installed in a mobile phone with a camera often has been made up of three lenses, but the number of the lenses tends to further increase to be compatible with a larger number of pixels. JP-A-2005-208236 describes an imaging lens made up of four lenses. In the imaging lens described in JP-A-2005-208236, a second lens placed from the object side is a negative lens with a concave surface directed to the object side.

However, there is still scope for improvement for the imaging lens described in JP-A-2005-208236 from the viewpoint of chromatic aberration, etc. To ensure the telecentric property, it is considered that an aperture diaphragm is placed close to the object side as much as possible. In this case, if the surface of the second lens on the object side thereof is concave like the imaging lens described in JP-A-2005-208236, the manufacturing sensitivity becomes high and, for example, if a lens position shift occurs at the manufacturing time, image surface variation easily occurs.

SUMMARY OF THE INVENTION

An object of an illustrative, non-limiting embodiment of the invention is to provide an imaging lens, which makes it possible to implement a high-performance lens system compatible with a larger number of pixels.

According to an aspect of the invention, there is provided an imaging lens comprising: in order from an object side of the imaging lens, a first lens of a positive lens with a convex surface directed to the object side thereof; a second lens having a negative refractive power and a meniscus shape with a concave surface directed to an image side thereof; a third lens having a positive refractive power and a meniscus shape with a convex surface directed to the image side thereof; a fourth lens with both surfaces being an aspheric surface, the fourth lens having a concave surface on the image side in the proximity of an optical axis thereof; and a fifth lens of a positive or negative lens with both surfaces being an aspheric surface. The imaging lens satisfies conditional expressions:

$$vd1 > 50 \tag{1}$$

$$vd2 < 30 \tag{2}$$

$$vd4 < 30 \tag{3}$$

wherein vd1 is an Abbe number of the first lens, vd2 is an Abbe number of the second lens, and vd4 is an Abbe number of the fourth lens.

The imaging lens according to an aspect of the invention includes five lenses and is increased in the number of lenses as compared with the imaging lens including three or four lenses in the related art, and the lens material and the surface shape of each lens are optimized, whereby the high-performance lens system compatible with a larger number of pixels is provided. Particularly, conditional expressions (1), (2), and (3) are satisfied, whereby the correction effects of axial chromatic aberration and lateral color are produced. The second lens is a negative meniscus with a concave surface directed to the image side, so that the image surface variation caused by a position shift at the manufacturing time is decreased and the lens system with excellent manufacturing suitability is provided.

In the imaging lens, the fourth lens and the fifth lens may satisfy conditional expressions:

$$G4D(0.0) < G4D(0.7) < G4D(1.0) \tag{4}$$

$$G45D(1.0) < G45D(0.0) \tag{5}$$

$$G5\text{Max}H < G4\text{Max}H \tag{6}$$

wherein G4D (0.0) is a thickness of the fourth lens on the optical axis, G4D (0.7) is a thickness of the fourth lens at position where an effective diameter of an image-side surface of the fourth lens is 70%, G4D (1.0) is a thickness of the fourth lens at position where an effective diameter of the image-side surface of the fourth lens is 100%, G45D (0.0) is an air spacing between the fourth lens and the fifth lens on the optical axis, G45D (1.0) is an air spacing between the fourth lens and the fifth lens at position wherein an effective diameter of an object-side surface of the fifth lens is 100%, G4MaxH is a height from the optical axis to a position where a lens thickness of the fourth lens is the largest, and G5MaxH is a height from the optical axis to a position where a lens thickness of the fifth lens is the largest.

In the imaging lens, an image-side surface of the fifth lens is concave in the proximity of the optical axis and convex in the periphery of the fifth lens. Accordingly, it becomes advantageous particularly for correcting field curvature and ensuring the telecentric property.

In the imaging lens, preferably the following conditional expressions are further satisfied. As the conditional expressions are satisfied, power distribution of the lenses is optimized and it becomes advantageous for miniaturizing the whole lens system while the telecentric property is ensured and the lateral color and the axial chromatic aberration are corrected.

$$|f2/f1| > 1 \tag{7}$$

$$1.0 < |f3 \times (1/f4 + 1/f5)| < 1.5 \tag{8}$$

wherein f1 is a focal length of the first lens, f2 is a focal length of the second lens, f3 is a focal length of the third lens, f4 is a focal length of the fourth lens, and f5 is a focal length of the fifth lens.

The imaging lens may include an aperture diaphragm closer to the object side than the image-side surface of the first lens or may include an aperture diaphragm between the first lens and the second lens. The aperture diaphragm is brought comparatively to the object side, so that it becomes advantageous for ensuring the telecentric property.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, an imaging lens includes five lenses and is increased in the number of lenses as compared with the imaging lens including three or four lenses in the related art, and the lens material and the surface shape of each lens are optimized, whereby the high-performance lens system compatible with a larger number of pixels can be implemented.

An exemplary embodiment of the invention will be discussed in detail with reference to the accompanying drawings.

Figure 1:
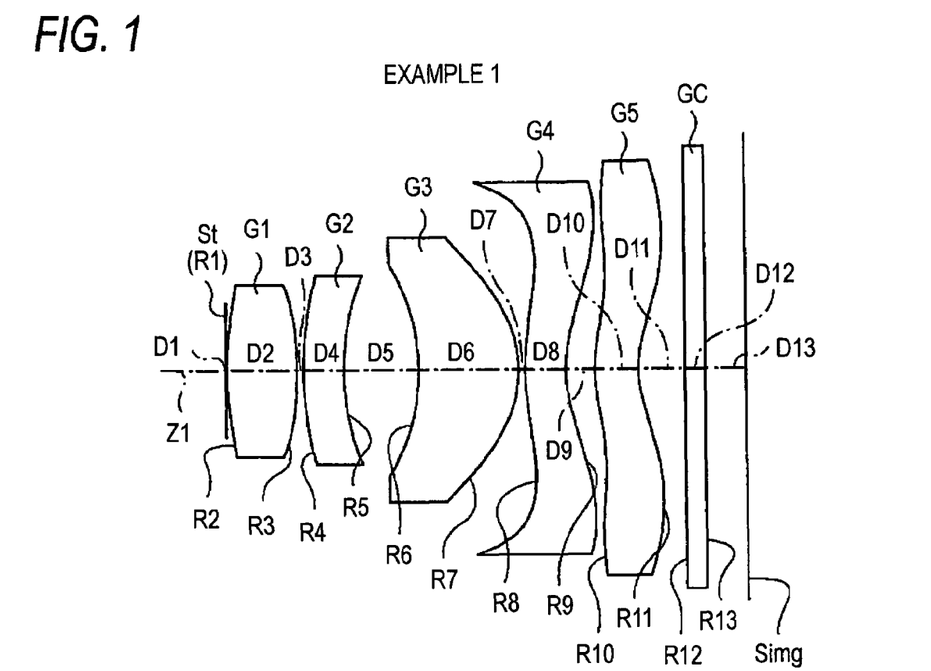
FIG. 1 is a sectional view of a lens corresponding to an imaging lens according to example 1 of the invention.
Figure 2:
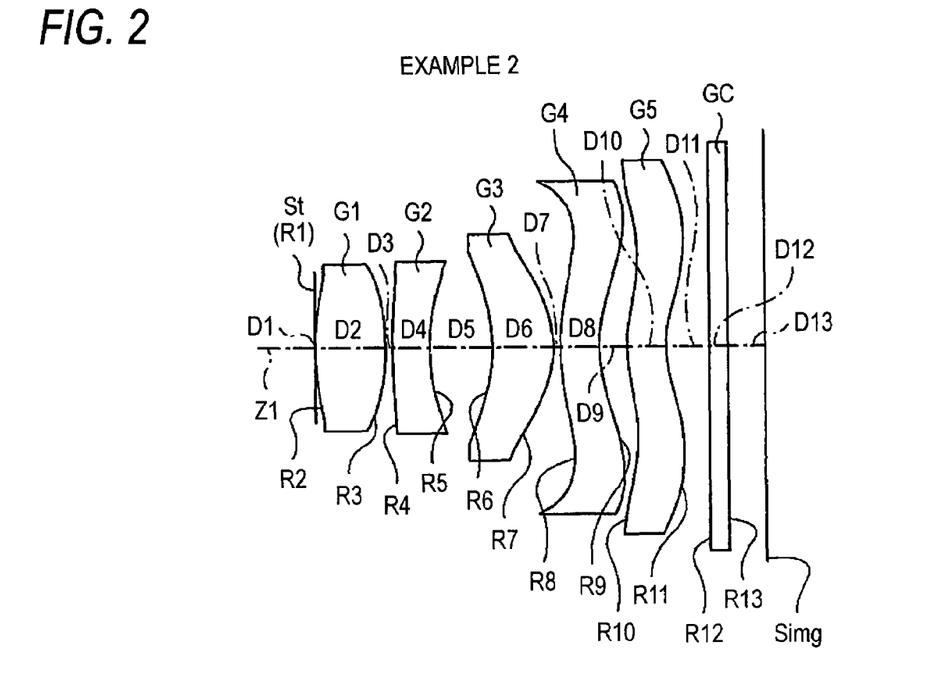
FIG. 2 is a sectional view of a lens corresponding to an imaging lens according to example 2 of the invention.
Figure 3:
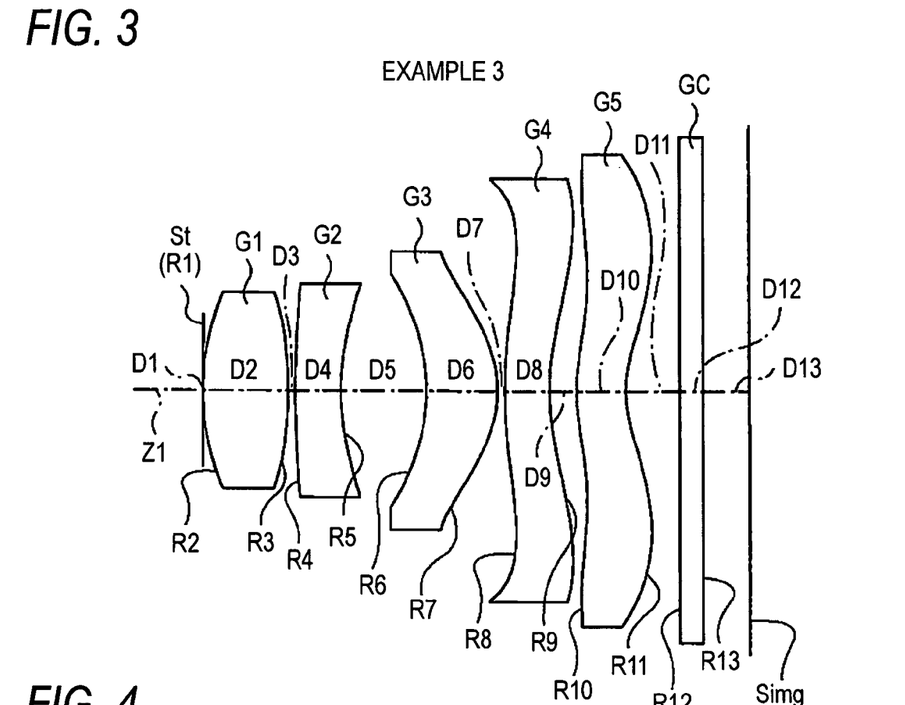
FIG. 3 is a sectional view of a lens corresponding to an imaging lens according to example 3 of the invention.
Figure 4:
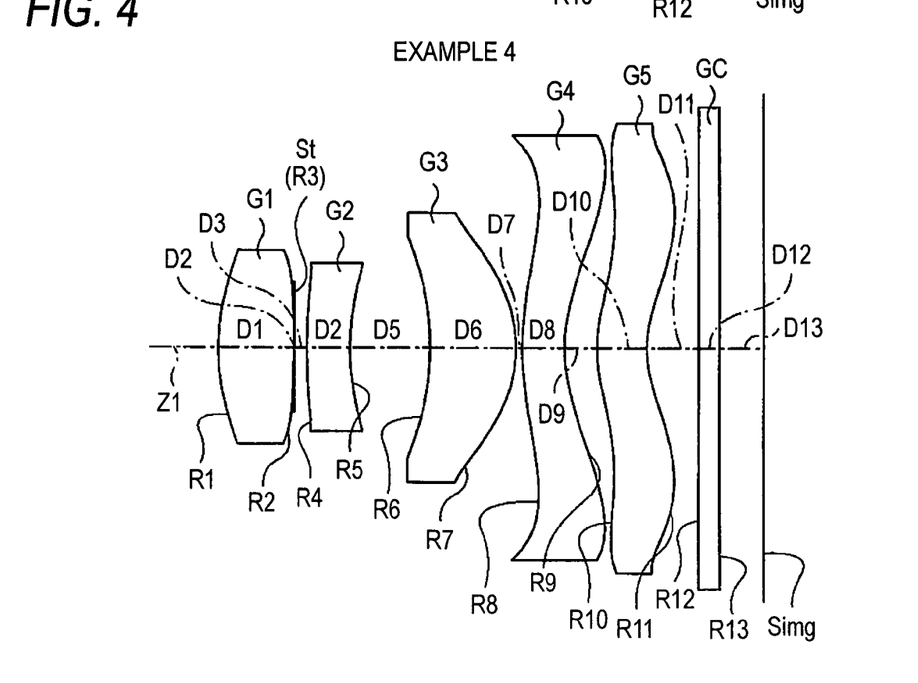
FIG. 4 is a sectional view of a lens corresponding to an imaging lens according to example 4 of the invention.

FIG. 1 shows a first configuration example of an imaging lens as an exemplary embodiment of the invention. This configuration example corresponds to the lens configuration in a first numeric example described later with reference to FIGS. 5(A) and 5(B). FIG. 2 shows a second configuration example. This configuration example corresponds to the lens configuration in a second numeric example described later with reference to FIGS. 6(A) and 6(B). FIG. 3 shows a third configuration example. This configuration example corresponds to the lens configuration in a third numeric example described later with reference to FIGS. 7(A) and 7(B). FIG. 4 shows a fourth configuration example. This configuration example corresponds to the lens configuration in a fourth numeric example described later with reference to FIGS. 8(A) and 8(B). In FIGS. 1 to 4, symbol Ri denotes the curvature radius of the ith surface when the surface of the component nearest to an object is the first and symbols are given so as to increase in order toward the image side (image formation side). Symbol Di denotes the surface distance on an optical axis Z1 between the ith surface and the (i+1)st surface. The configuration examples are the same in basic configuration and therefore the description to follow is based on the configuration example of the imaging lens shown in FIG. 1.

The imaging lens can be used for various imaging apparatus using an imaging device of a CCD, a CMOS, etc., for example, a mobile telephone, a digital still camera, a digital video camera, etc., for example. The imaging lens includes a first lens G1, a second lens G2, a third lens G3, a fourth lens G4, and a fifth lens G5 placed in order from the object side along the optical axis Z1. An optical aperture diaphragm St is placed at the object-side surface of the first lens G1, more particularly, is placed closer to the object side than the image-side surface of the first lens G1 on the optical axis Z1. The aperture diaphragm St may be placed between the first lens G1 and the second lens G2 on the optical axis Z1 as in the fourth configuration example in FIG. 4.

An imaging device of a CCD, etc., is placed on an image formation surface Simg of the imaging lens. Various optical members GC are placed between the fifth lens G5 and the imaging device in response to the configuration of the camera in which the lenses are placed. For example, flat optical members of cover glass for protecting the imaging surface, an infrared cut filter, etc., are placed.

The first lens G1 is a positive lens with a convex surface, for example, a biconvex lens, directed to the object side. The second lens G2 is a negative meniscus lens with a concave surface directed to the image side. The third lens G3 is a positive meniscus lens with a convex surface directed to the image side. The fourth lens G4 is a negative lens with both surfaces made aspheric. The fifth lens G5 is a negative lens or a positive lens with both surfaces made aspheric.

Preferably, the object-side surface of the fourth lens G4 is convex in the proximity of the optical axis and concave in the periphery of the fourth lens G4. Preferably, the image-side surface of the fourth lens G4 is concave in the proximity of the optical axis and convex in the periphery of the fourth lens G4. Preferably, the object-side surface of the fifth lens G5 is convex in the proximity of the optical axis and concave in the periphery of the fifth lens G5 or is aspheric such that it becomes once a concave in an intermediate portion and again becomes a convex. Preferably, the image-side surface of the fifth lens G5 is concave in the proximity of the optical axis and convex in the periphery of the fifth lens G5.

The imaging lens satisfies the following conditions wherein $vd1$ is the Abbe number of the first lens G1, $vd2$ is the Abbe number of the second lens G2, and $vd4$ is the Abbe number of the fourth lens G4:

$$vd1 > 50 \tag{1}$$

$$vd2 < 30 \tag{2}$$

$$vd4 < 30 \tag{3}$$

Preferably, the imaging lens also satisfies the following conditions:

$$G4D(0.0) < G4D(0.7) < G4D(1.0) \tag{4}$$

$$G45D(1.0) < G45D(0.0) \quad (5)$$

$$G5MaxH < G4MaxH \quad (6)$$

Figure 14:
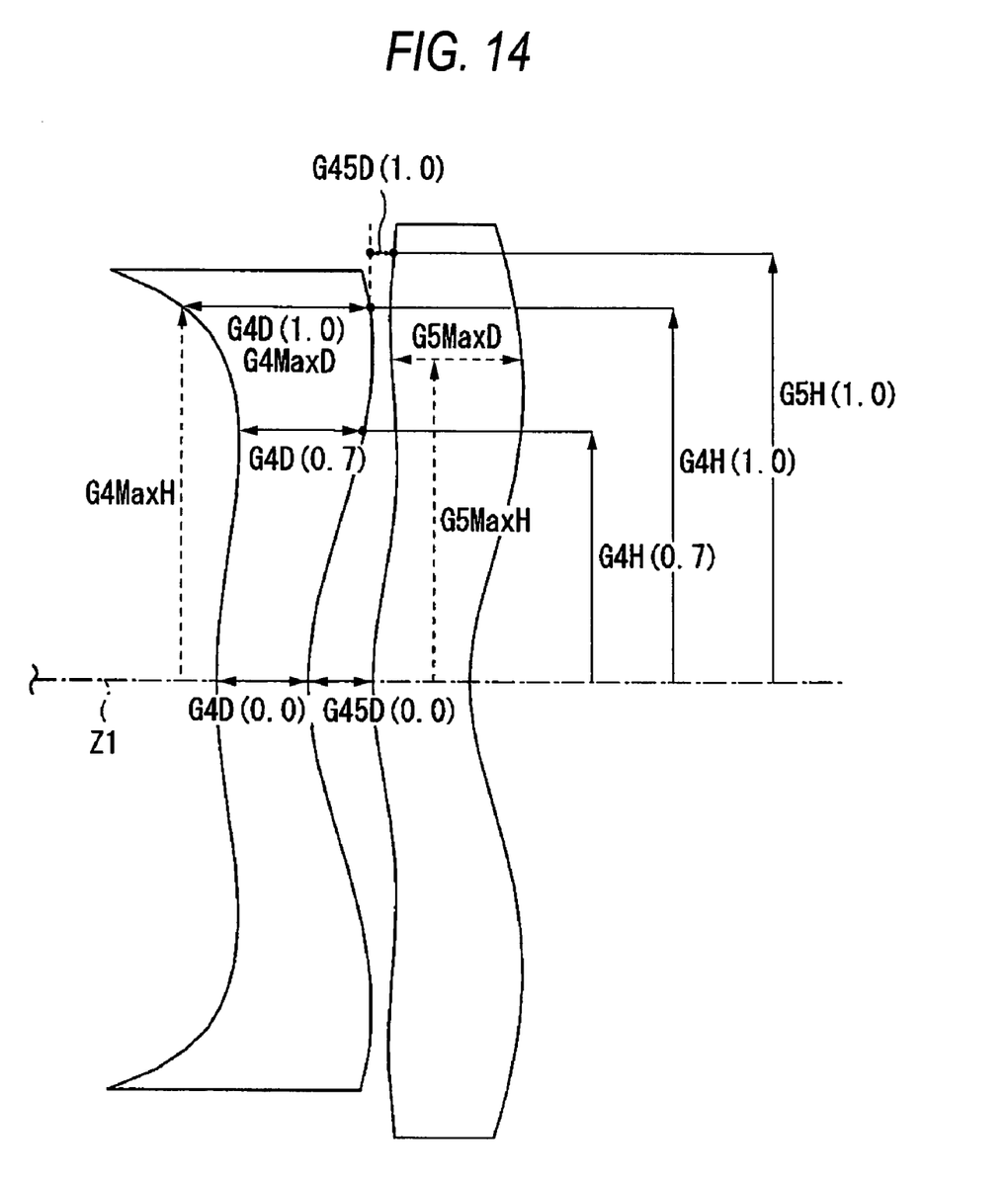
FIG. 14 is a schematic representation about conditional expressions.

Parameters of conditional expressions (4) to (6) will be discussed with reference to FIG. 14. G4D (0.0) denotes the thickness of the fourth lens G4 on the optical axis Z1, G4D (0.7) denotes the thickness of the fourth lens G4 at the position G4H (0.7) where the effective diameter of the image-side surface of the fourth lens G4 is 70%, and G4D (1.0) denotes the thickness of the fourth lens G4 at the position G4H (1.0) where the effective diameter of the image-side surface of the fourth lens G4 is 100%. G45D (0.0) denotes the air spacing between the fourth lens G4 and the fifth lens G5 on the optical axis Z1, and G45D (1.0) denotes the air spacing between the fourth lens G4 and the fifth lens G5 at the position G5H (1.0) where the effective diameter of the object-side surface of the fifth lens G5 is 100%. G4MaxH denotes the height of the position G4MaxD from the optical axis Z1, where the lens thickness of the fourth lens G4 is the largest, and G5MaxH denotes the height of the position G5MaxD from the optical axis Z1, where the lens thickness of the fifth lens G5 is the largest.

Preferably, the imaging lens further satisfies the following conditions wherein f1 is the focal length of the first lens G1, f2 is the focal length of the second lens G2, f3 is the focal length of the third lens G3, f4 is the focal length of the fourth lens G4, and f5 is the focal length of the fifth lens G5:

$$|f2/f1| > 1 \quad (7)$$

$$1.0 < |f3 \times (1/f4 + 1/f5)| < 1.5 \quad (8)$$

Next, the functions and the advantages of the imaging lens described above will be discussed.

The imaging lens includes five lenses and is increased in the number of lenses as compared with the imaging lens made up of three or four lenses in the related art, and the lens material, power distribution of the lenses, and the surface shape of each lens are optimized, whereby the high-performance lens system compatible with a larger number of pixels is provided. In the imaging lens, the optical aperture diaphragm St is brought comparatively to the object side, so that the telecentric property is ensured. If the aperture diaphragm St is brought to the object side, the manufacturing sensitivity becomes high and, for example, if a lens position shift occurs at the manufacturing time, image surface variation easily occurs; in the imaging lens, however, the second lens G2 has a negative meniscus shape with a concave surface directed to the image side, so that the image surface variation is decreased and the lens system with excellent manufacturing suitability is provided.

In the imaging lens, the first lens G1 of a positive lens is made of such a low-dispersion lens material satisfying conditional expression (1) and the second lens G2 and the fourth lens G4 each of a negative lens are made of such a high-dispersion lens material satisfying conditional expressions (2) and (3), whereby the correction effects of axial chromatic aberration and lateral color are produced. If the number falls below the lower limit in conditional expression (1), it is not preferable because mainly the axial chromatic aberration increases and the performance is degraded. If the number exceeds the upper limit in conditional expression (2), it is not preferable because mainly the axial chromatic aberration and the lateral color increase and the performance is degraded. If the number exceeds the upper limit in conditional expression (3), it is not preferable because mainly the lateral color increases and the performance is degraded. To better correct the chromatic aberration, preferably the upper limits in conditional expressions (2) and (3) are the following value:

$$vd2 < 29 \quad (2A)$$

$$vd4 < 29 \quad (3A)$$

In the imaging lens, the aspheric shape in each of the fourth lens G4 and the fifth lens G5 placed on the image side is changed to a shape different in the center part and the peripheral part, whereby field curvature is well corrected from the center of the image surface to the peripheral part. It is advantageous for ensuring the telecentric property and the incidence angle of a light beam on the imaging device surface is made close to vertical from the center of the image surface to the peripheral part. In this case, conditional expressions (4), (5), and (6) are satisfied as for the fourth lens G4 and the fifth lens G5, whereby the incidence angle of the principal ray on the imaging surface with respect to the optical axis Z1 is lessened and it is advantageous for ensuring the telecentric property and it is also advantageous for correcting the lateral color.

Conditional expressions (7) and (8) are satisfied, whereby miniaturization of the whole lens system is realized while the telecentric property is ensured and the lateral color and the axial chromatic aberration are corrected. Conditional expression (7) defines the appropriate power relationship between the two lenses on the object side (the first lens G1 and the second lens G2). If the value falls below the lower limit in conditional expression (7), it is not preferable because the whole length of the lens system is long although it is advantageous for decreasing the chromatic aberration. Conditional expression (8) defines the appropriate power relationship among the three lenses on the image surface side (the third lens G3, the fourth lens G4, and the fifth lens G5). If the value exceeds the upper limit in conditional expression (8), it is not preferable because the incidence angle of the principal ray on the imaging surface with respect to the optical axis Z1 increases and the telecentric property worsens. In contrast, if the value below the lower limit, it is not preferable because the lateral color and the axial chromatic aberration increase and the performance is degraded although it is advantageous for shortening the whole length and ensuring the telecentric property.

As described above, according to the imaging lens of the embodiment, the number of lenses is increased as compared with the imaging lens made up of three or four lenses in the related art, and the lens material, the surface shape of each lens, and power distribution of the lenses are optimized, so that the high-performance lens system compatible with a larger number of pixels can be implemented.

EXAMPLES

Next, specific numeric examples of the imaging lens according to the embodiment will be discussed. First to fourth numeric examples will be discussed together.

Figure 5A:
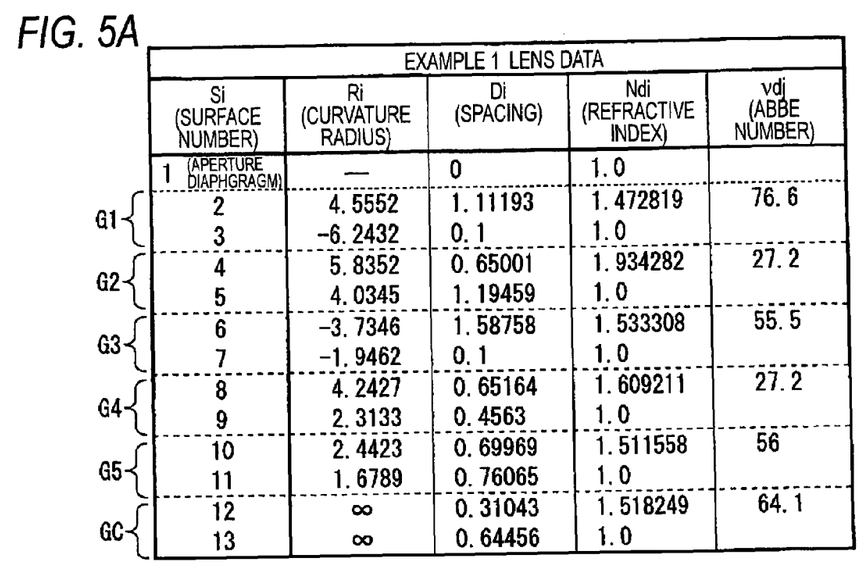
FIG. 5 is a drawing to show lens data of the imaging lens according to example 1 of the invention; (A) shows lens data and (B) shows lens data concerning aspheric surfaces.
Figure 5B:
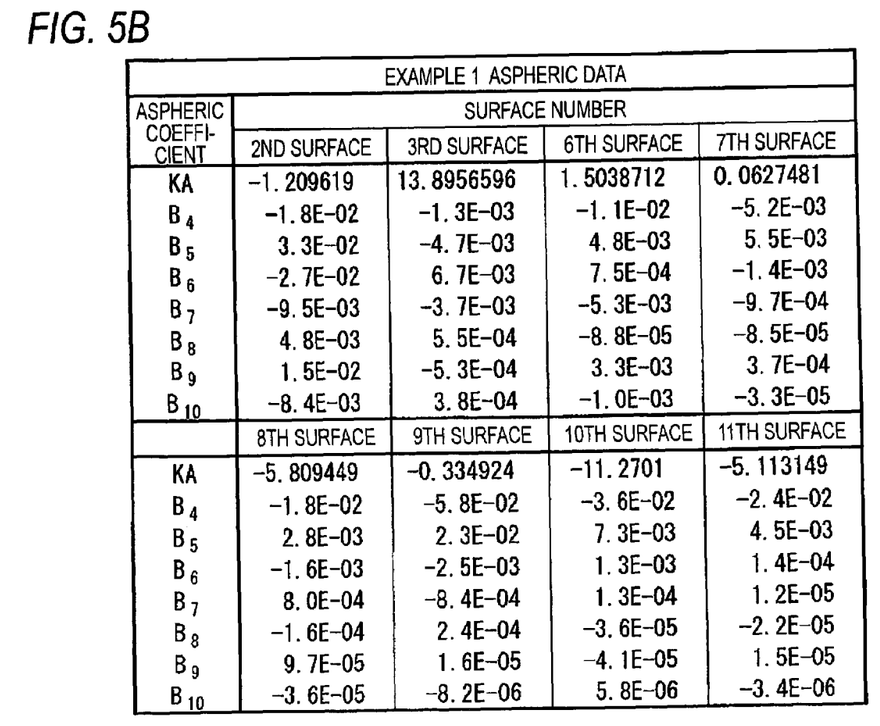

FIGS. 5(A) and 5(B) show numeric data of the imaging lens according to example 1. Particularly, FIG. 5(A) shows lens data and FIG. 5(B) shows data concerning aspheric surfaces. The column of surface number Si in the lens data shown in FIG. 5(A) indicates the number of the ith (i=1 to 13) surface with the symbol given so as to increase in order toward the image side wherein the surface of the component nearest to the object side is the first. The column of curvature radius Ri indicates the value (mm) of the curvature radius of the ith surface from the object side corresponding to the symbol Ri given in FIG. 1. Likewise, the column of spacing Di also indicates the spacing (mm) on the optical axis between the ith surface Si and the "i+1"st surface Si+1 from the object side. Ndj indicates the value of the refractive index at the d-line (wavelength 587.6 nm) between the adjacent lens surfaces. The column of vdj indicates the value of the Abbe number of the jth (j=1 to 6) optical element from the object side at the d-line (wavelength 587.6 nm).

In the imaging lens according to example 1, both surfaces of each of the first lens G1, the third lens G3, the fourth lens G4, and the fifth lens G5 except the second lens G2 are aspheric. In the lens data in FIG. 5(A), the numeric value of the curvature radius in the proximity of the optical axis is shown as the curvature radius of each of the aspheric surfaces. In the numeric values shown as aspheric data in FIG. 5(B), symbol "E" indicates that the numeric value following the symbol "E" is "exponent" with 10 as the base and indicates that the numeric value represented by the exponential function with 10 as the base is multiplied by the numeric value preceding "E." For example, if "1.0E-02" is shown, it indicates "$1.0 \times 10^{-2}$."

As the aspheric data, the values of coefficients $B_i$ and KA in the expressions of aspheric shapes represented by the following expression (A) are shown. Z more particularly indicates the length (mm) of the normal to the tangential plane of the top of an aspheric surface (plane perpendicular to the optical axis Z1) from a point on the aspheric surface at the position of height h from the optical axis Z1. In the imaging lens according to example 1, each aspheric surface is represented effectively using fourth-order to tenth-order coefficients $B_4$ to $B_{10}$ as aspheric coefficient $B_i$.

$$Z=C \cdot h^2/\{1+(1-KA \cdot C^2 \cdot h^2)^{1/2}\}+\Sigma B_i \cdot h^i \text{ } (i=4 \text{ to } 10) \quad (A)$$

where

Figure 6A:
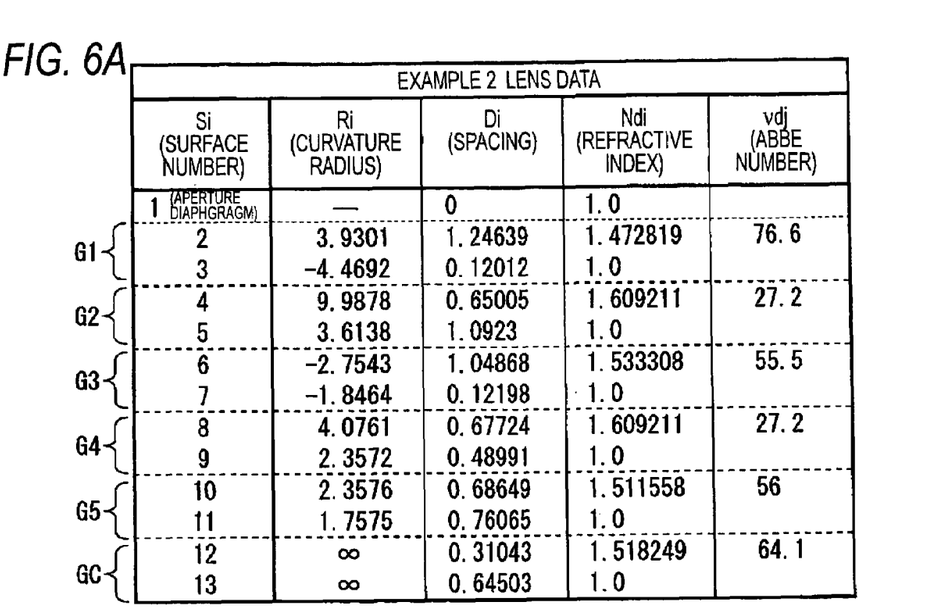
FIG. 6 is a drawing to show lens data of the imaging lens according to example 2 of the invention; (A) shows lens data and (B) shows lens data concerning aspheric surfaces.
Figure 6B:
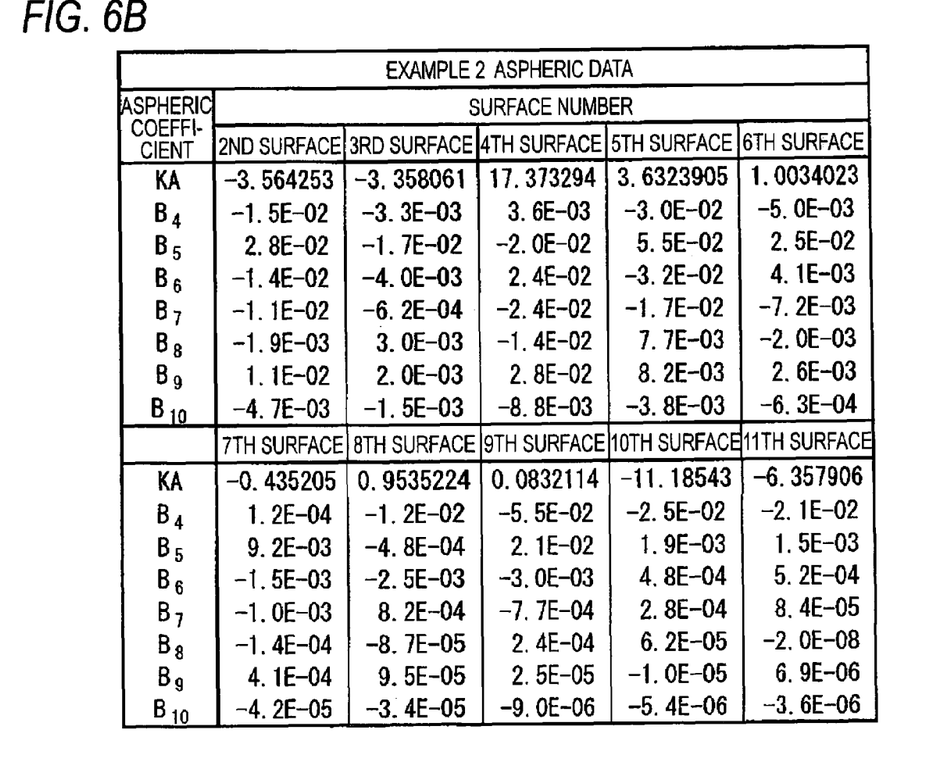
Figure 7A:
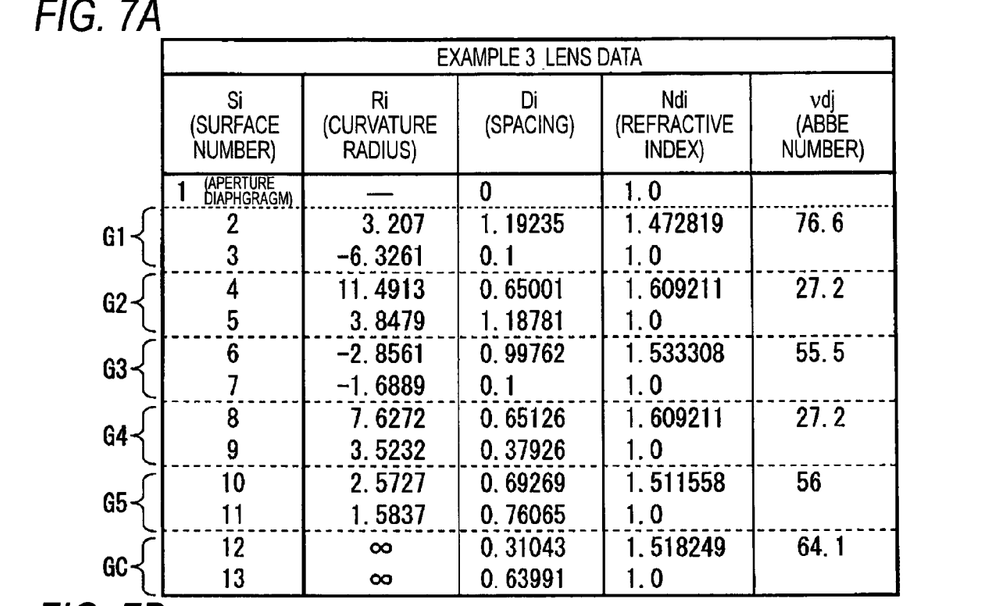
FIG. 7 is a drawing to show lens data of the imaging lens according to example 3 of the invention; (A) shows lens data and (B) shows lens data concerning aspheric surfaces.
Figure 7B:
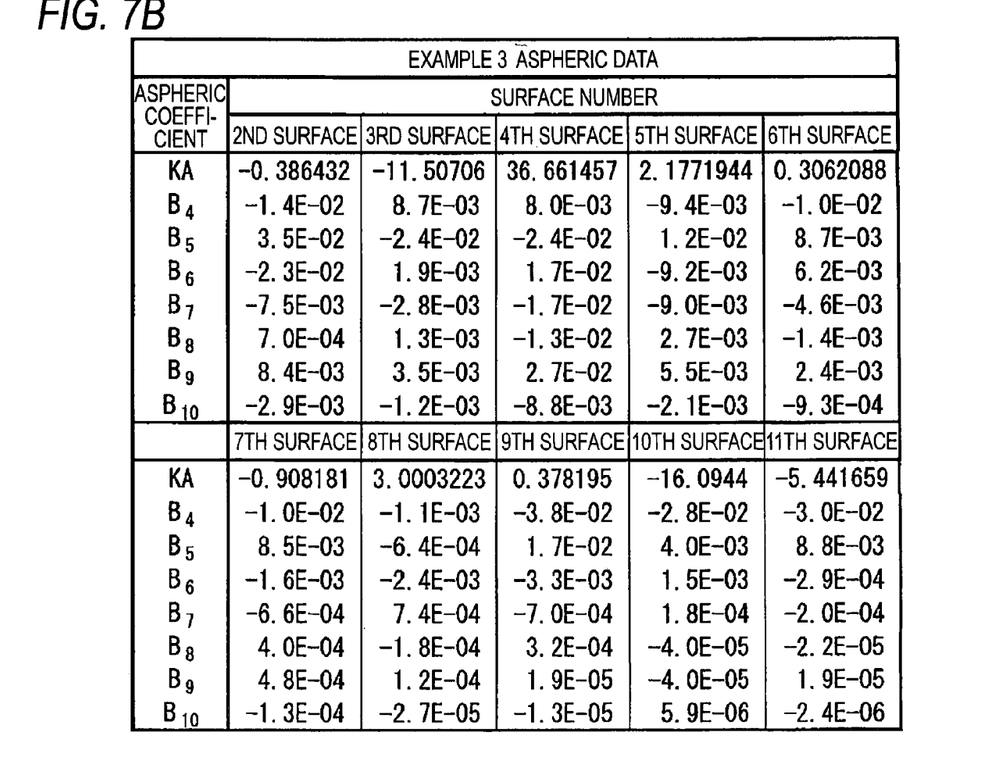
Figure 8A:
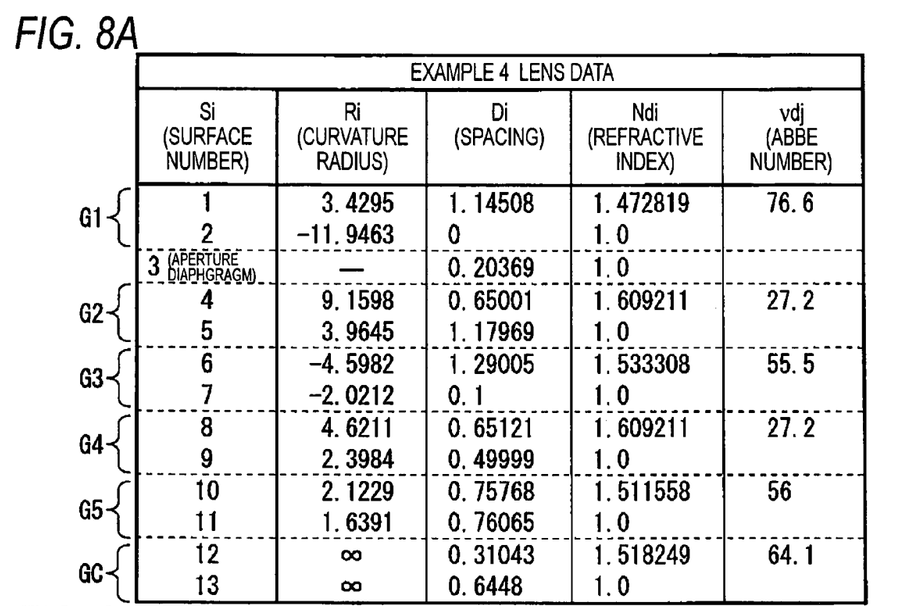
FIG. 8 is a drawing to show lens data of the imaging lens according to example 4 of the invention; (A) shows lens data and (B) shows lens data concerning aspheric surfaces.
Figure 8B:
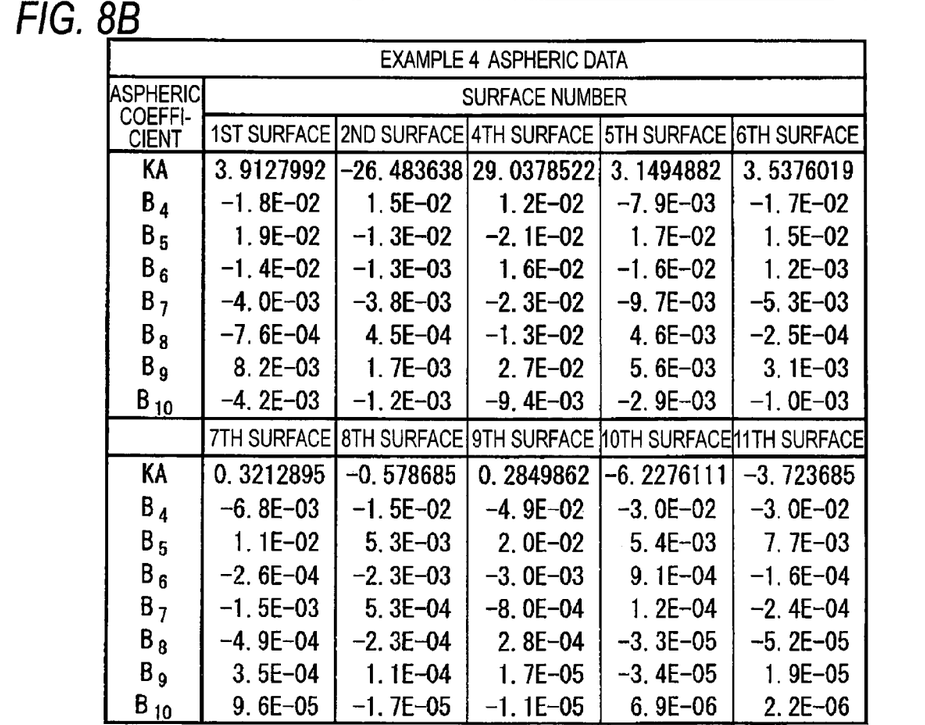

Z: Depth of aspheric surface (mm)
h: Distance from optical axis to lens surface (height) (mm)
KA: Eccentricity (second-order aspheric coefficient)
C: Paraxial curvature=1/R
(R: Paraxial curvature radius)
$B_i$: ith-order aspheric coefficient FIGS. 6(A), 7(A), and 8(A) show the lens data of imaging lenses according to examples 2 to 4 like the imaging lens according to example 1 described above. Likewise, FIGS. 6(B), 7(B), and 8(B) show the data concerning aspheric surfaces of the imaging 20 lenses according to examples 2 to 4. In all of the imaging lenses according to examples 2 to 4, both surfaces of each of the first lens G1, the second lens G2, the third lens G3, the fourth lens G4, and the fifth lens G5 are aspheric.

Figure 9:
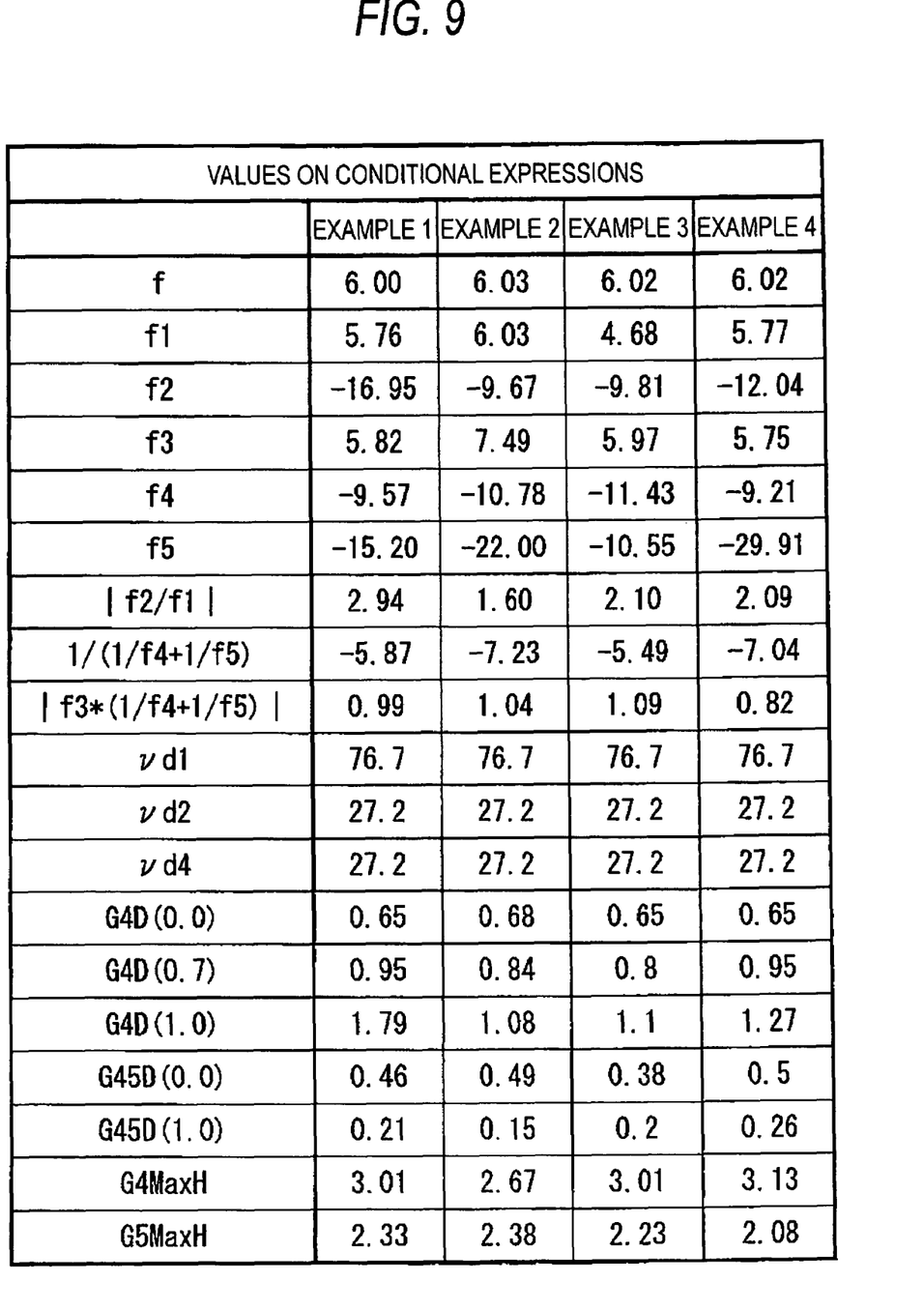
FIG. 9 is a drawing to show the values concerning conditional expressions collectively about the examples.

FIG. 9 shows the values concerning the conditional expressions described above.

In FIG. 9, f denotes the paraxial focal length of the whole system (mm). f1, f2, f3, f4, and f5 denote the paraxial focal lengths (mm) of the first lens G1, the second lens G2, the third lens G3, the fourth lens G4, and the fifth lens G5 respectively. As seen in FIG. 9, the values in the examples are all within the numeric ranges in the conditional expressions.

Figure 10A:
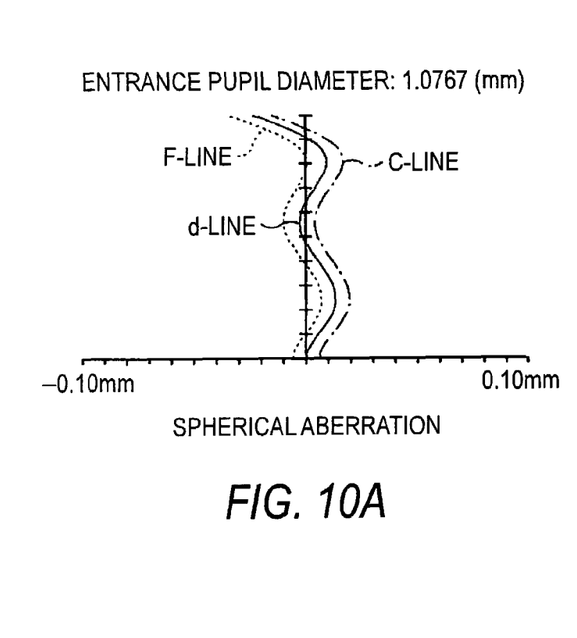
FIG. 10 is an aberration drawing to show aberrations and distortion of the imaging lens according to example 1 of the invention; (A) shows spherical aberration, (B) shows astigmatism, and (C) shows distortion.
Figure 10B:
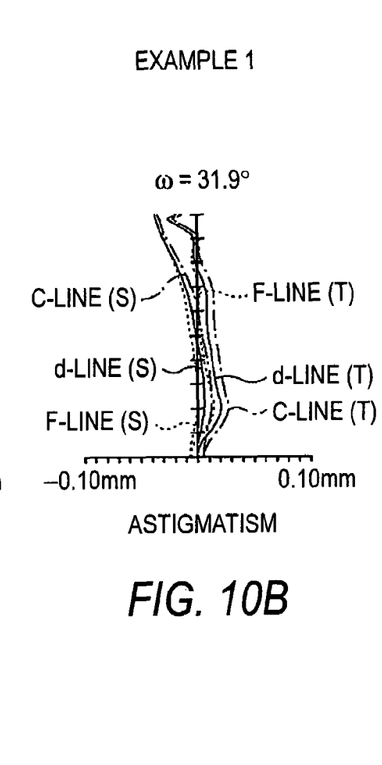
Figure 10C:
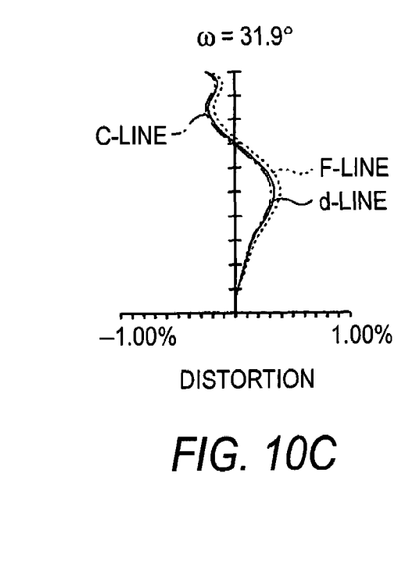

FIGS. 10(A) to 10(C) show spherical aberration, astigmatism (field curvature), and distortion in the imaging lens according to example 1. Each aberration drawing also shows the aberration at the C-line (wavelength 656.27 nm) and the F-line (wavelength 486.13 nm) with the d-line as the reference wavelength. In the astigmatism drawing, S indicates aberration in a sagittal direction and T indicates aberration in a tangential direction. ω indicates half angle of view. In FIG. 10(A), the longitudinal direction indicates entrance pupil diameter (mm).

Figure 11A:
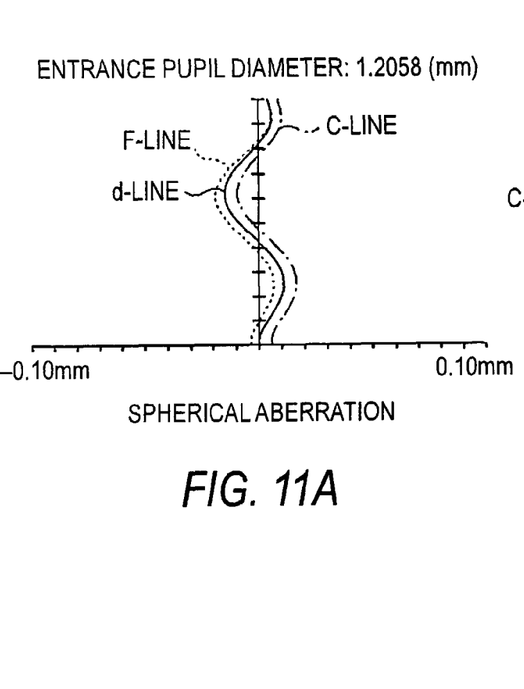
FIG. 11 is an aberration drawing to show aberrations and distortion of the imaging lens according to example 2 of the invention; (A) shows spherical aberration, (B) shows astigmatism, and (C) shows distortion.
Figure 11B:
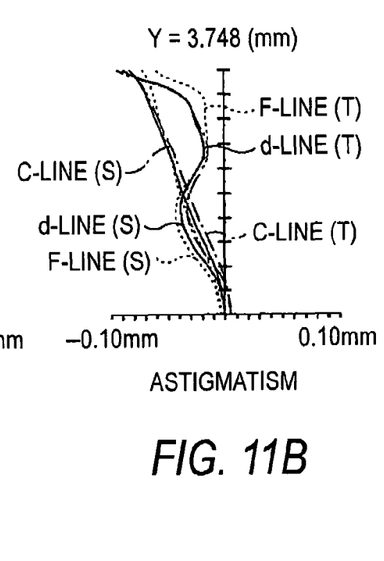
Figure 11C:
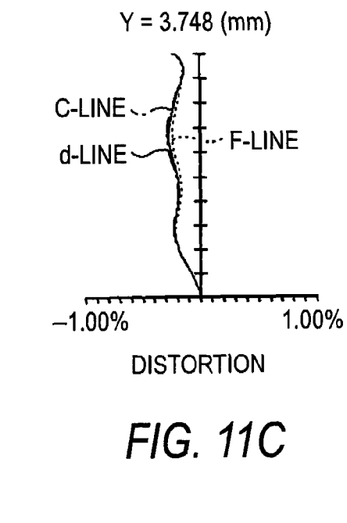
Figure 12A:
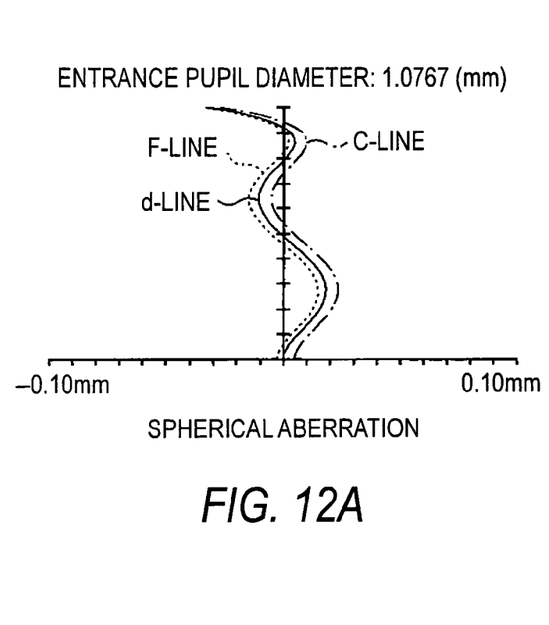
FIG. 12 is an aberration drawing to show aberrations and distortion of the imaging lens according to example 3 of the invention; (A) shows spherical aberration, (B) shows astigmatism, and (C) shows distortion.
Figure 12B:
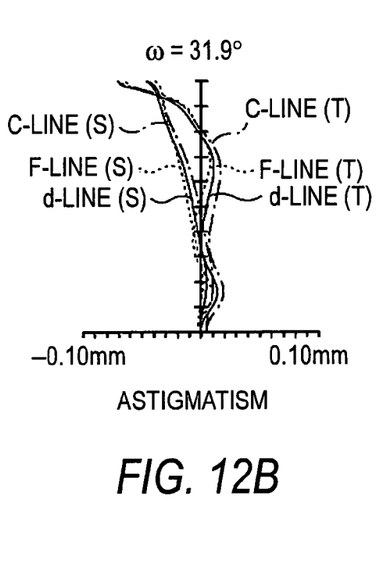
Figure 12C:
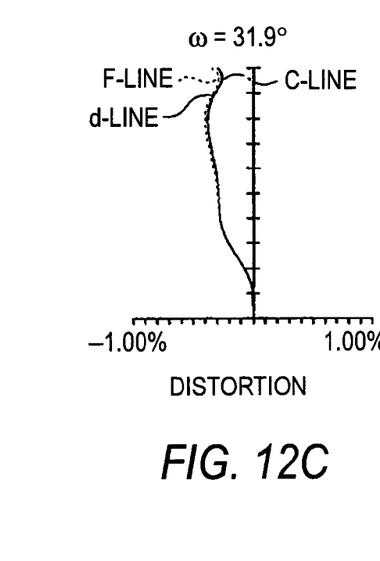
Figure 13A:
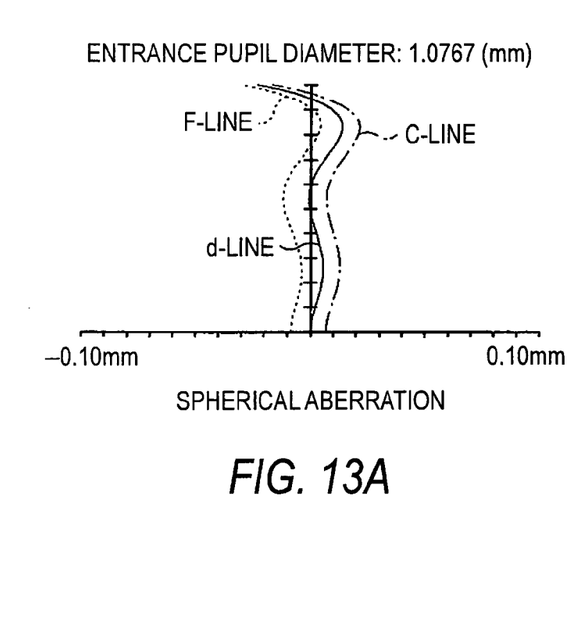
FIG. 13 is an aberration drawing to show aberrations and distortion of the imaging lens according to example 4 of the invention; (A) shows spherical aberration, (B) shows astigmatism, and (C) shows distortion.
Figure 13B:
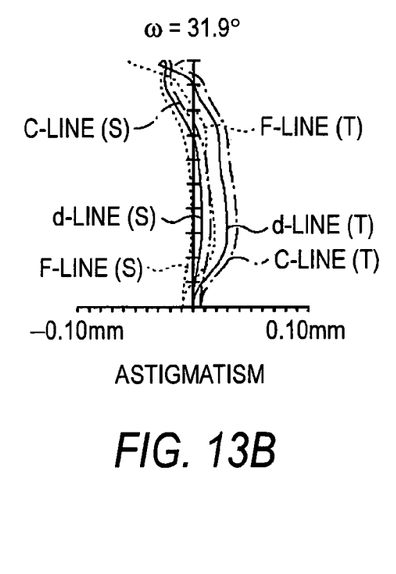
Figure 13C:
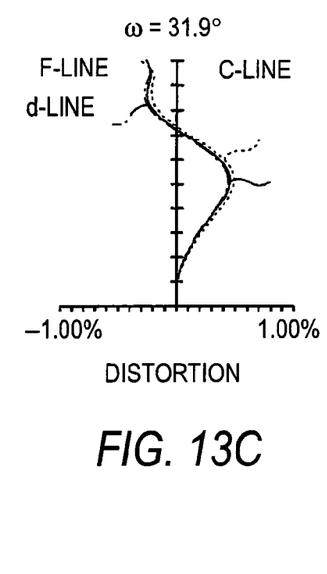

Likewise, FIGS. 11(A) to 11(C) show aberrations and distortion about the imaging lens according to example 2; FIGS. 12(A) to 12(C) show aberrations and distortion about the imaging lens according to example 3; and FIGS. 13(A) to 13(C) show aberrations and distortion about the imaging lens according to example 4. In FIGS. 11(B) and 11(C), the longitudinal direction indicates image height Y (mm).

As seen from the numeric data and the aberration drawings, the imaging lens according to each example is made up of five lenses, and the lens material, the surface shape of each lens, and power distribution of the lenses are optimized, so that the high-performance imaging lens system can be implemented.

It is to be understood that the invention is not limited to the specific embodiment or examples thereof and various modifications may be made. For example, the values of the curvature radius, the spacing, the refractive index, and the like of each lens component are not limited to the values shown in the numeric examples and can take any other value.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-87408, filed Mar. 28, 2006, the entire disclosure of which is herein incorporated by reference.

What is claimed is:

1. An imaging lens comprising: in order from an object side of the imaging lens,
    a first lens of a positive lens with a convex surface directed to the object side thereof;
    a second lens having a negative refractive power and having a meniscus shape with a concave surface directed to an image side thereof;
    a third lens having a positive refractive power and having a meniscus shape with a convex surface directed to the image side thereof;
    a fourth lens with both surfaces being an aspheric surface, the fourth lens having a concave surface on the image side in the proximity of an optical axis thereof; and
    a fifth lens of a positive or negative lens with both surfaces being an aspheric surface,
    wherein the imaging lens satisfies conditional expressions:

$vd1>50$ (1)

$vd2<30$ (2)

$vd4<30$ (3)

wherein
    vd1 is an Abbe number of the first lens,
    vd2 is an Abbe number of the second lens, and
    vd4 is an Abbe number of the fourth lens.

2. The imaging lens according to claim 1 wherein the fourth lens and the fifth lens satisfy conditional expressions:

$G4D(0.0)<G4D(0.7)<G4D(1.0)$ (4)

$G45D(1.0)<G45D(0.0)$ (5)

$G5MaxH<G4MaxH$ (6)

wherein
    G4D (0.0) is a thickness of the fourth lens on the optical axis,

G4D (0.7) is a thickness of the fourth lens at position corresponding to 70% of an effective diameter of an image-side surface of the fourth lens, G4D (1.0) is a thickness of the fourth lens at position corresponding to 100% of an effective diameter of the image-side surface of the fourth lens, G45D (0.0) is an air spacing between the fourth lens and the fifth lens on the optical axis, G45D (1.0) is an air spacing between the fourth lens and the fifth lens at position corresponding to 100% of an effective diameter of an object-side surface of the fifth lens, G4MaxH is a height from the optical axis to a position where a lens thickness of the fourth lens is the largest, and G5MaxH is a height from the optical axis to a position where a lens thickness of the fifth lens is the largest.

3. The imaging lens according to claim 2, wherein an image-side surface of the fifth lens is concave in the proximity of the optical axis and convex in the periphery of the fifth lens.

4. The imaging lens according to claim 3, further satisfying conditional expressions $$|f2/f1|>1 \qquad (7)$$

$$1.0<|f3\times(1/f4+1/f5)|<1.5 \qquad (8)$$

wherein
f1 is a focal length of the first lens,
f2 is a focal length of the second lens,
f3 is a focal length of the third lens,
f4 is a focal length of the fourth lens, and
f5 is a focal length of the fifth lens.

5. The imaging lens according to claim 4, further comprising an aperture diaphragm closer to the object side than an image-side surface of the first lens.

6. The imaging lens according to claim 4, further comprising an aperture diaphragm between the first lens and the second lens.

7. The imaging lens according to claim 3, further comprising an aperture diaphragm closer to the object side than an image-side surface of the first lens.

8. The imaging lens according to claim 3, further comprising an aperture diaphragm between the first lens and the second lens.

9. The imaging lens according to claim 2, further satisfying conditional expressions $$|f2/f1|>1 \qquad (7)$$

$$1.0<|f3\times(1/f4+1/f5)|<1.5 \qquad (8)$$

wherein
f1 is a focal length of the first lens,
f2 is a focal length of the second lens,
f3 is a focal length of the third lens,
f4 is a focal length of the fourth lens, and
f5 is a focal length of the fifth lens.

10. The imaging lens according to claim 9, further comprising an aperture diaphragm closer to the object side than an image-side surface of the first lens.

11. The imaging lens according to claim 9, further comprising an aperture diaphragm between the first lens and the second lens.

12. The imaging lens according to claim 2, further comprising an aperture diaphragm closer to the object side than an image-side surface of the first lens.

13. The imaging lens according to claim 2, further comprising an aperture diaphragm between the first lens and the second lens.

14. The imaging lens according to claim 1, wherein an image-side surface of the fifth lens is concave in the proximity of the optical axis and convex in the periphery of the fifth lens.

15. The imaging lens according to claim 14, further satisfying conditional expressions $$|f2/f1|>1 \qquad (7)$$

$$1.0<|f3\times(1/f4+1/f5)|<1.5 \qquad (8)$$

wherein
f1 is a focal length of the first lens,
f2 is a focal length of the second lens,
f3 is a focal length of the third lens,
f4 is a focal length of the fourth lens, and
f5 is a focal length of the fifth lens.

16. The imaging lens according to claim 15, further comprising an aperture diaphragm closer to the object side than an image-side surface of the first lens.

17. The imaging lens according to claim 15, further comprising an aperture diaphragm between the first lens and the second lens.

18. The imaging lens according to claim 14, further comprising an aperture diaphragm closer to the object side than an image-side surface of the first lens.

19. The imaging lens according to claim 14, further comprising an aperture diaphragm between the first lens and the second lens.

20. The imaging lens according to claim 1, further satisfying conditional expressions $$|f2/f1|>1 \qquad (7)$$

$$1.0<|f3\times(1/f4+1/f5)|<1.5 \qquad (8)$$

wherein
f1 is a focal length of the first lens,
f2 is a focal length of the second lens,
f3 is a focal length of the third lens,
f4 is a focal length of the fourth lens, and
f5 is a focal length of the fifth lens.

21. The imaging lens according to claim 20, further comprising an aperture diaphragm closer to the object side than an image-side surface of the first lens.

22. The imaging lens according to claim 20, further comprising an aperture diaphragm between the first lens and the second lens.

23. The imaging lens according to claim 1, further comprising an aperture diaphragm closer to the object side than an image-side surface of the first lens.

24. The imaging lens according to claim 1, further comprising an aperture diaphragm between the first lens and the second lens.

* * * * *